United States Patent

Rebholz et al.

[11] Patent Number: 5,592,853
[45] Date of Patent: Jan. 14, 1997

[54] POWER-SHIFTABLE, MULTIPLE GEAR REVERSING GEAR BOX

[75] Inventors: Wolfgang Rebholz; Fritz Leber, both of Friedrichshafen, Germany

[73] Assignee: ZF Friedrichshafen AG, Friedrichshafen, Germany

[21] Appl. No.: 433,380

[22] PCT Filed: Dec. 15, 1993

[86] PCT No.: PCT/EP93/03539

§ 371 Date: May 8, 1995

§ 102(e) Date: May 8, 1995

[87] PCT Pub. No.: WO94/15116

PCT Pub. Date: Jul. 7, 1994

[30] Foreign Application Priority Data

Dec. 18, 1992 [DE] Germany .............. 42 42 942.0

[51] Int. Cl.⁶ ..................... F16H 3/093; F16H 61/00

[52] U.S. Cl. ............. 74/325; 74/331; 192/70.11; 192/112

[58] Field of Search ................ 74/325, 331, 333; 192/70.11, 70.21, 112

[56] References Cited

U.S. PATENT DOCUMENTS

| 2,867,126 | 1/1959 | Bolster | 74/331 |
| 3,102,432 | 9/1963 | Gerst | 74/331 |
| 3,913,411 | 10/1975 | Jameson | 74/331 X |
| 4,570,503 | 2/1986 | Theobald | 74/333 X |
| 4,771,647 | 9/1988 | Stevens | 74/331 |
| 4,864,881 | 9/1989 | Beeson et al. | 74/331 X |

FOREIGN PATENT DOCUMENTS

| 1286532 | 1/1962 | France . | |
| 179550 | 9/1985 | Japan | 74/331 |
| 1208695 | 10/1970 | United Kingdom . | |
| 2125121 | 2/1984 | United Kingdom . | |
| 88/02452 | 4/1988 | WIPO . | |

OTHER PUBLICATIONS

Design Practices Passenger Car Automatic Transmission, 3rd Edition, by SAE Transmission/Axle/Driveline Forum Committee, p. 194, Aug. 1994.

Primary Examiner—Khoi Q. Ta
Attorney, Agent, or Firm—Davis and Bujold

[57] ABSTRACT

The invention relates to a power-shiftable multiple gear reversing transmission (1). It is a transmission in a countershaft design, such as specially used in construction machines. To achieve a high number of light parts and keep low the development of noise, it is proposed according to the invention to situate a single clutch (21 to 24) upon each countershaft (17 to 20). The idler gears (25 to 28) associated with the clutches (21 to 24) form a driving gear chain (29). The solution according to the invention is particularly distinguished by a small axial length of the countershafts. It is possible thus to use helical gearings with large angles of slope.

5 Claims, 2 Drawing Sheets

POWER-SHIFTABLE, MULTIPLE GEAR REVERSING GEAR BOX

The invention concerns a power-shiftable multiple gear reversing transmission. It is a transmission such as specially used in construction machines like wheel loaders, excavator loaders, etc. or in lift trucks.

BACKGROUND OF THE INVENTION

A reversing transmission of the kind in question has an input shaft and several countershafts. Wheels forming a changing set are provided. Upon the countershafts are situated clutches (so-called directional clutches and gear-selector clutches) with idler gears, which can optionally be non-rotatably connected with one countershaft for shifting speed and direction. The power take off results from an output gear set. The number of fixed gears depends upon the number of speeds of the transmission.

Power-shiftable reversing transmissions with a countershaft design are distinguished by a series of advantages. For this reason such transmissions are used in many commercial vehicles. The multiplicity of working machines demands a constantly increasing degree of adaptability of the transmission in order to utilize the power and torque of the engine. It is disadvantageous that the installation space is sometimes considerably large, to which to the fact that said transmissions have considerable axial length and/or considerable width in the cross section of the vehicle also contributes. Another problem is that the known transmissions tend to vibrate and generate noise. It has been shown that noise generation that was accepted years ago in construction machines is no longer accepted today.

SUMMARY OF THE INVENTION

This invention is based on the problem of providing a power-shiftable multiple gear reversing transmission in a countershaft design, which in particular, has a great number of equal parts, is flexible in the number of speeds to be provided and is also especially distinguished by a small emission of noise.

The problem on which the invention is based is solved by the fact that a single clutch is situated on each countershaft and a single idler gear is associated with each clutch, in a manner such that the idler gears of each countershaft are constantly meshed with each other. The idler gears of each countershaft thus form a drive gear chain. For each speed to be shifted, one fixed gear of one countershaft is in permanent engagement with one fixed gear of the output shaft. A valuable advantage of the solution according to the invention is the small axial length of the countershafts, since each one has to house only three structural parts (clutch, idler gear and fixed gear). Gearings with large angles of slope can preferably be used without the countershaft being thereby burdened with high bending loads. The proposed design ensures a high number of equal parts. The transmission is flexible with regard to the number of speeds to be provided and is especially distinguished by a very smooth running. It is to be borne in mind here that the transmission is preferably installed separate from the axle to be driven. It is advantageous to arrange the clutches and the idler gears in a common vertical plane so that the installation space can be kept relatively small in the axial direction.

Since each countershaft has to accommodate only a limited number of parts, there results the added advantage that each countershaft can be supported on both ends by two roller bearings within one housing. It is of further advantage here to arrange the plurality of roller bearings in equal vertical planes.

In a housing formed of at least two parts, a particularly simple design results when the partition is used for the supply of oil. The valves can here be placed in a housing part. It is then further advantageous to provide ducts in a common vertical plane, which produce a connection of the valves to the clutches for oil supply. The ducts are preferably integrally cast. An oil supply is thereby made possible without a cutting process.

In a specially advantageous structural configuration, the fixed gears of the reversing and output gear set abut directly on a housing wall. The strong tooth forces can hereby be introduced over the shortest path in the housing. But this fact also means that gearings of large angles of slope can be used in order to keep the generation of noises to a minimum.

The clutches are preferably multi-disc clutches that are hydraulically actuatable against a spring force and switched via the valves. For oil supply, axially oriented bores branch off from the ducts in the partition between two housing parts. It is hereby possible to provide axially oriented bores in the carriers of the outer discs of the clutches. Thus the pressurized oil needed for actuation of the clutches is passed over the shortest path into the annular spaces of the clutches.

It is advantageous to group the countershafts substantially forming a circle around the input shaft for fitting a reversing transmission in a lift truck. In combination with the short axial length, the transmission can be placed spatially before the axle of the lift truck.

BRIEF DESCRIPTION OF THE DRAWING(S)

Other features essential to the invention and advantages resulting therefrom are to be understood from the following description of an embodiment. In the drawing.

DESCRIPTION OF THE PREFERRED EMBODIMENT(S)

Figure 1:
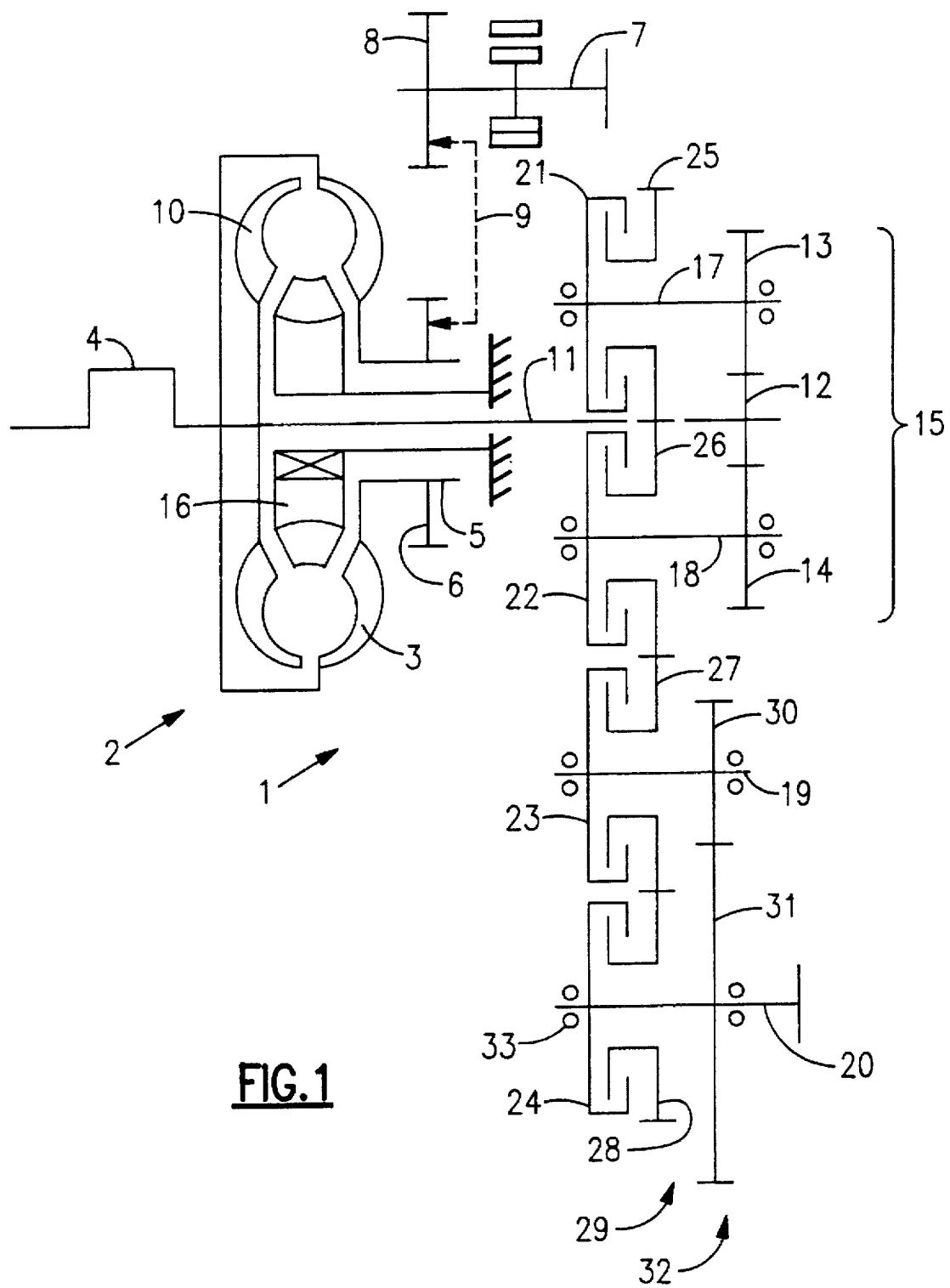
FIG. 1 shows a transmission diagram illustrating an embodiment of a two-speed reversing transmission.

In FIG. 1 a transmission diagram of a power-shiftable reversing transmission is reproduced. It is a two-speed reversing transmission on which a hydrodynamic torque converter 2, which is generally common, for ex., in heavy construction vehicles, can be front mounted.

An impeller 3 of the hydrodynamic torque converter is in driving connection with a likewise diagrammatically shown engine 4. On an output shaft 5 of the impeller 3 is non-rotatably situated a gear 6 which meshes with another gear 8 likewise non-rotatably situated upon a countershaft 7, as indicated with the dotted connection 9. The gears 6 and 8 and the countershaft 7 form a power take off with which an oil pump, for ex., can be operated in accordance with the speed of the engine.

The turbine wheel 10 of the hydrodynamic torque converter 2 is non-rotatably connected with an input shaft 11. A fixed gear 12 is situated on the end, appearing to the right in the drawing, of the penetrating input shaft 11 (for the sake of clarity the input shaft 11 is reproduced broken in the drawing). The fixed gear 12 meshes with other fixed gears 13 and 14. The fixed gears 12, 13 and 14 form a changing set 15.

The stator 16 is stationarily supported by a free wheel, as is generally the norm.

The reversing transmission 1 is designed in a countershaft construction. The reversing transmission has a total of four countershafts 17, 18, 19 and 20. The fixed gears 13 and 14 of the changing set 15 are placed upon the countershafts 17 and 18.

A single clutch 21, 22, 23 and 24 is placed on each of the respective countershafts 17 to 20. Said clutches 21 to 24 can be, for ex., multi-disc clutches that are hydraulically actuatable against the force of springs. But other designs are also possible. The actuation, for ex., can be electromagnetic.

One idler wheel 25, 26, 27 and 28 is rotatably situated on each of the respective countershafts 17 to 20. The idler gears 25 to 28 permanently mesh with each other and are in a common vertical plane. They form a driving gear chain highlighted by the arrow 29.

The idler gear 25 is associated with the clutch 21 and the idler gear 26 with the clutch 22. When the clutch 21 or 22 is open, the idler gear 25 or 26 transmits no torque. If the clutch is closed, the respective idler gear 25 or 26 becomes non-rotatably connected with the countershaft 17 or 18.

The changing set 15, combined with the clutches 21 and 22, allows a reversal of the direction of rotation of the countershaft 20 (in this case of the output shaft of the transmission). For this reason the clutches 21 and 22 are also designated as directional clutches. The clutches 23 and 24 form the gear-selector clutches for the first speed (clutch 23 is closed) and the second speed (clutch 24 is closed). In the first speed the power is transmitted via a fixed gear 30, that is non-rotatably situated upon the countershaft 19, to another fixed gear 31 of the countershaft 20. The fixed gears 30 and 31 form an output gear set 32.

The second speed is engaged when the clutch 24 is closed. The power flows via the driving gear chain 29 directly to the countershaft (output shaft) 20.

The gear diagram explained above is based on a power-shiftable two-speed reversing transmission. It is to be noted that upon each one of the countershafts 17 to 20 there is respectively situated a single clutch 21 to 24, a single idler gear 25 to 28 and a single fixed gear 13, 14 or 30, 31. By virtue of the limited number of structural elements, there results a very short axial length of each one of the countershafts 17 to 20. The countershafts 17 to 20 are respectively supported by roller bearings 33.

To achieve the lowest possible noise level, the idler and fixed gears (25 to 28 and 12 to 14, the same as 30) are helically cut. Gearings with large angles of slope are preferably used. Due to the axially short design of the countershafts 17 to 20, no great bending loads result.

Figure 2:
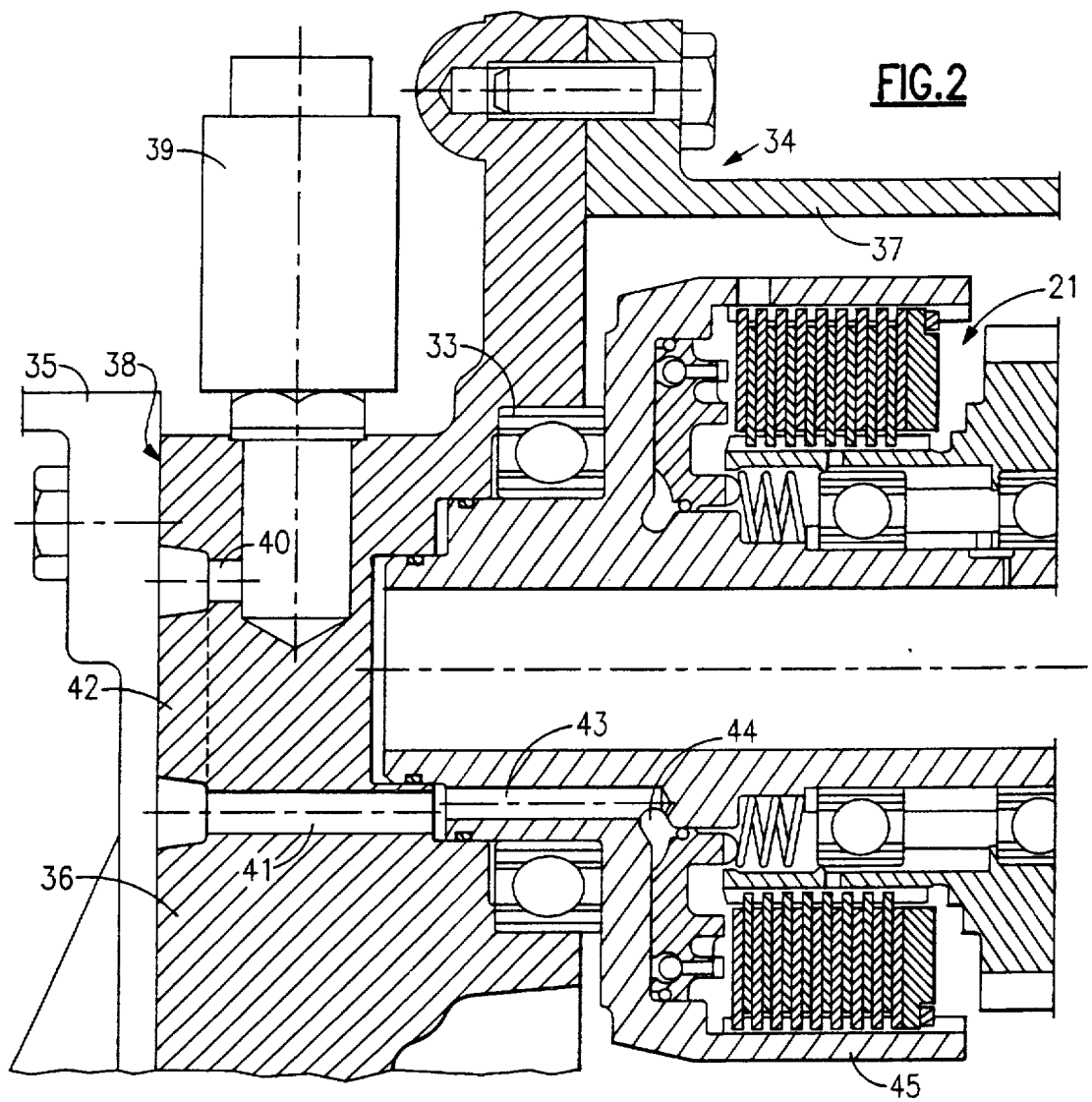
FIG. 2 shows details concerning the supply of oil to a clutch.

In FIG. 2 a detail of the reversing transmission 1 is shown. In particular, the clutch 21, which lies on top in FIG. 1, (forward directional clutch) is reproduced. In the drawing, the impeller 3 is to be understood by way of suggestion. The housing 34 of the reversing transmission is formed of several parts. In the embodiment described, the housing 34 is comprised of three parts 35, 36 and 37. The partition 38 between the parts 35 and 36 serves to supply oil for actuating the clutch 21. The valves required for shifting, of which one valve 39 is reproduced, are lodged in the part 36. The bores 40 and 41, needed for the supply of oil, both lead to the valves 39 themselves and to the clutches 21 to 24 are lodged in the part 36 of the housing 34. The oil is distributed via ducts 42, that are preferably integrally cast in the part 36 of the housing 34. Said ducts 42 are easily formed, from the point of view of the casting practice, and easy to clean. A cutting process is not necessary. The part 35 is at the same time the converter bell of the hydrodynamic torque converter. It serves to cover the partition 38. It is advantageous that the intermediate plates, that are otherwise used for oil supply, are eliminated.

The bore 41 is lengthened by another bore 43. Said bore is situated in the carrier 45 of the outer discs of the clutch 21 and leads to an annular space 44 of the clutch 21. It can be easily understood that the clutch 21 is a wet, multi-disc clutch that is hydraulically actuated against the force of springs. The rest of the clutches 21 to 24 are similarly designed.

As can also be understood from the reproduction corresponding of FIG. 2, it is also possible to indirectly support the countershafts 17 to 20 in the part 36 of the housing 34 by the carriers of the outer discs of the clutches 21 to 24 over the already mentioned roller bearings 33.

Figure 3:
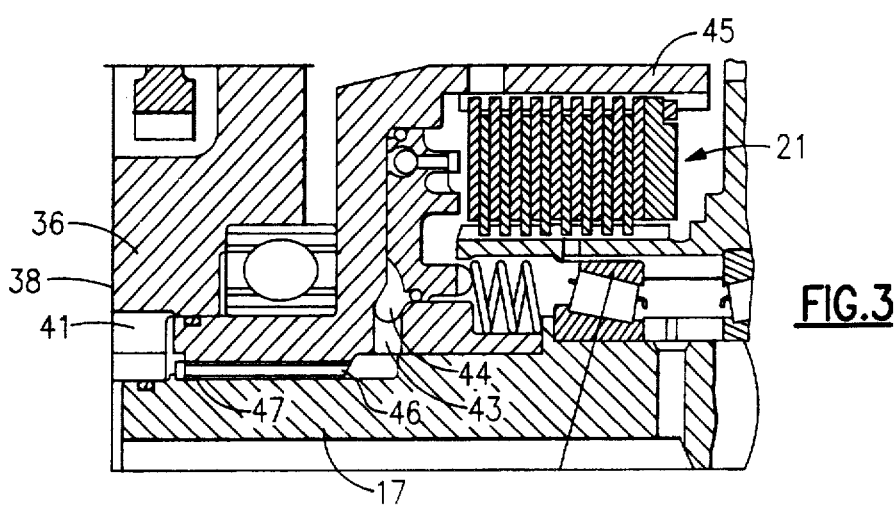
FIG. 3 shows details concerning a modified supply of oil to a clutch.

The reversing transmission 1 is substantially circular in designed (seen in longitudinal direction), which is not evident from the drawing. The countershafts 7 to 20 are grouped forming a circle around the input shaft 11. In FIG. 3, a modified supply of oil is graphically shown. The carrier 45 of the outer discs of one of the clutches, such as the clutch 21, has an inner gearing 46. The outer gearing 47 of the countershaft 17 (or of the countershaft 18, 19 or 20) meshes with said inner gearing. The carrier 45 is non-turnably connected with the countershaft 17 by the inner gearing 46 and the outer gearing 47. The bore 41 passes through the part 36 of the housing 34 and ends in the area of the inner and outer gearings 46, 47, which in the drawing begin at the left. The oil for actuating the clutch is fed to the annular space 44 of the clutch 21, via the bore 41, the inner and outer gearings 46, 47 and the—radially oriented—bore 43 in the carrier 45 of the outer discs.

Since the oil inlets, as were separately explained in FIG. 2 and 3, are independent of the configuration of the transmission 1, separate protection is claimed for said features of the solution.

| Reference numbers | |
|---|---|
| 1 | reversing transmission |
| 2 | torque converter |
| 3 | impeller |
| 4 | engine |
| 5 | output shaft |
| 6 | toothed wheel or gear |
| 7 | countershaft |
| 8 | toothed wheel or gear |
| 9 | connection |
| 10 | turbine wheel |
| 11 | input shaft |
| 12 | fixed gear |
| 13 | fixed gear |
| 14 | fixed gear |
| 15 | changing set |
| 16 | stator |
| 17 | countershaft |
| 18 | countershaft |
| 19 | countershaft |
| 20 | countershaft |
| 21 | clutch |
| 22 | clutch |
| 23 | clutch |
| 24 | clutch |
| 25 | idler gear |
| 26 | idler gear |

-continued

| Reference numbers | | |
|---|---|---|
| 27 | idler gear | |
| 28 | idler gear | |
| 29 | driving gear chain (arrow 29) | |
| 30 | fixed gear | |
| 31 | fixed gear | |
| 32 | output gear set | |
| 33 | roller bearing | |
| 34 | housing | |
| 35 | part of the housing 34 | |
| 36 | part of the housing 34 | |
| 37 | part of the housing 34 | |
| 38 | partition | |
| 39 | valve | |
| 40 | bore | |
| 41 | bore | |
| 42 | duct | |
| 43 | bore | |
| 44 | annular space | |
| 45 | carrier | |
| 46 | outer gearing | |
| 47 | inner gearing | |

We claim:

1. In a power-shiftable multiple gear reversing transmission (1), having a multi-part housing (34), an input shaft (11) and counter-shafts (17 to 20) with fixed gears (12 to 14, 30, 31) to form a changing set (15) and an output gear set (32), a hydraulically actuatable clutch (21 to 24) situated upon each countershaft, an idler gear (25 to 28) associated with each clutch and being selectively non-rotatably connectable with the corresponding countershaft and oil for actuation of the clutches being supplied by valves (39), ducts (42) and housing bores (40, 41), wherein the improvement comprises:

a multipart housing having a first housing part (35) removably secured to a second housing part (36) to define a partition (38);

a valve (39) secured to the second housing part (36);

a clutch carrier (45) rotatably mounted in the second housing part (36);

at least first and second housing bores (40, 41) provided in the second housing part (36), the first bore (40) extending from the partition (38) to the valve (39), and the second bore (41) extending from the partition (38) to an annular cavity defined by the second housing part (36) and the clutch carrier (45);

a duct (42) provided in the second housing part (36) adjacent the partition (38) and being extended between the two housing bores (40, 41);

a carrier bore (43) provided in the clutch carrier (45) and extending from the annular cavity defined by the second housing part (36) and the clutch carrier (45) to an annular space (44) of a clutch; and the valve (39), housing bores (40, 41), duct (42) and carrier bore (43) communicating such that an oil is containable therein for clutch actuation.

2. A transmission according to claim 1, wherein the housing bores (40, 41) are axially oriented.

3. A transmission according to claim 2, wherein the carrier bore (43) is axially oriented.

4. A transmission according to claim 2, wherein the carrier bore (43) is radially oriented.

5. A transmission according to claim 1, wherein the second housing bore (41) is connected with the carrier bore (43) by one inner gearing (46) and one outer gearing (47).

* * * * *